UNITED STATES PATENT OFFICE.

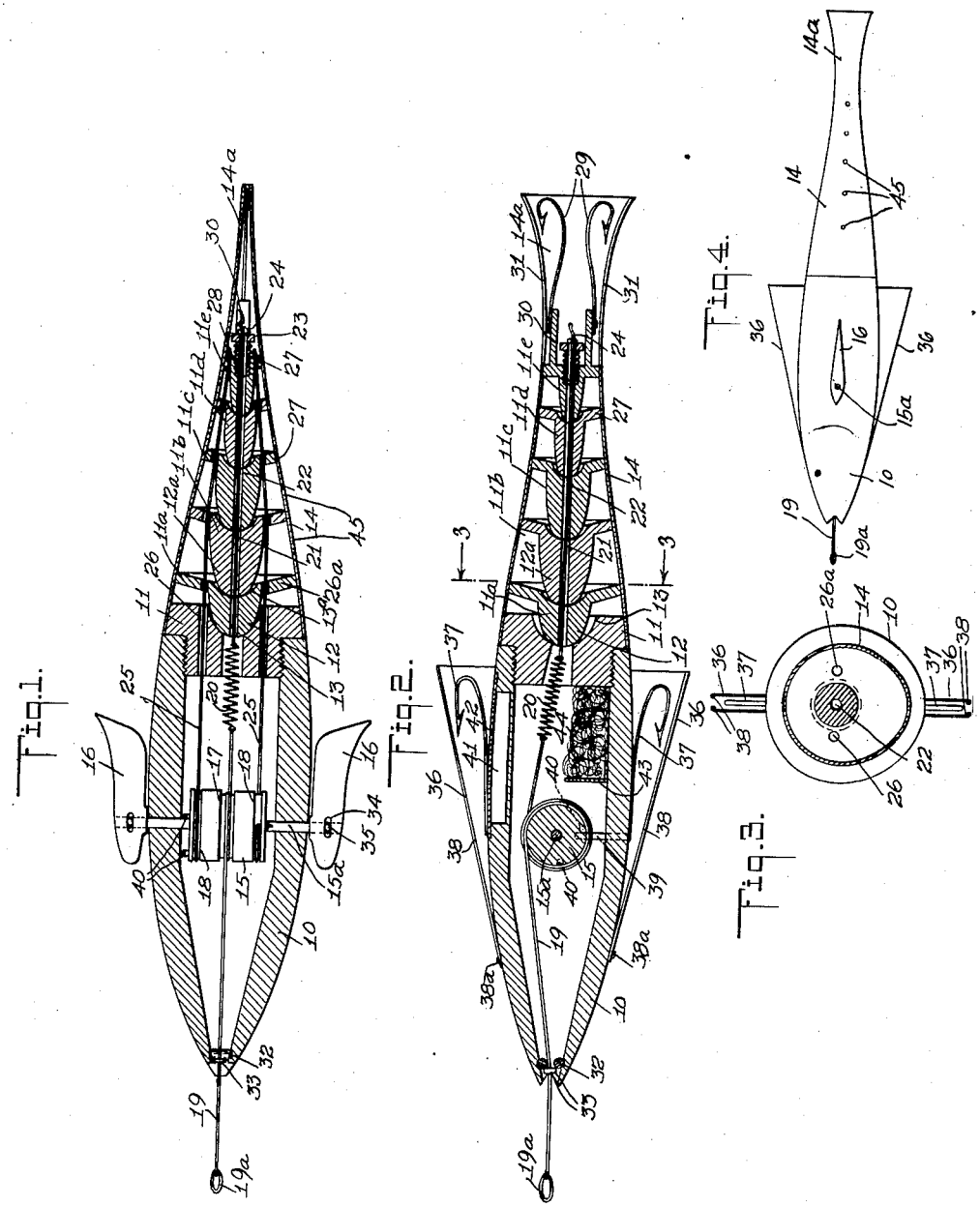

JOHN FRAME, OF SEARSPORT, MAINE.

ARTIFICIAL BAIT.

1,393,617.   Specification of Letters Patent.   Patented Oct. 11, 1921.

Application filed March 3, 1921. Serial No. 449,321.

*To all whom it may concern:*

Be it known that I, JOHN FRAME, a citizen of the United States, and a resident of Searsport, in the county of Waldo and State of Maine, have invented a new and Improved Artificial Bait, of which the following is a description.

The invention relates to an artificial fish bait and the invention has for its general object to provide an artificial bait improved in various particulars with respect to means for giving motion to the bait and more or less in simulation of the natural motions of a minnow and with respect to a novel arrangement of hooks and shields therefor to conceal the hooks while permitting of their being readily grasped by a fish and to otherwise increase the efficiency of the bait as a lure.

Reference is to be had to the accompanying drawings forming a part of this specification, it being understood that the drawings are merely illustrative of one example of the invention.

Figure 1 is a horizontal section taken longitudinally through the bait;

Fig. 2 is a longitudinal vertical section;

Fig. 3 is a transverse vertical section on the line 3—3, Fig. 2;

Fig. 4 is a diagrammatic side elevation of the bait.

In carrying out my invention in accordance with the illustrated example the body 10 is given the general shape of a minnow and is made of any suitable material. The rear portion of the bait is made up of vertebræ, there being in the illustrated form an element 11 in the form of a screw plug at the rear end of the body 10 and vertebræ $11^a$, $11^b$, $11^c$ and $11^d$ in suitable number in succession in the rear of the plug 11, the forward element $11^a$ having a rounded end 12 bearing in a concave socket 13 in said block 11 and successive vertebræ $11^a$ presenting sockets $13^a$ for the rounded ends $12^a$ of adjacent elements so that the rear portion of the bait may be capable of universal movement. More or less of the body and particularly the rear portion has a flexible covering 14.

Within the body 10 is a transversely disposed drum 15, the shaft $15^a$ of which has support in body 10 and extends beyond the same to receive fins 16 hereinafter further referred to. The drum 15 has a central peripheral groove 17 and other peripheral grooves 18 at the sides. The groove 17 receives wraps of a length 19 of fish line or the like which extends forwardly beyond the mouth of the bait and is formed with an eye $19^a$ or given other suitable form at the front end for ready connection with the fish line. The rear end of the element 19 connects with the forward end of a retractile coil spring 20, the rear end of which extends into the plug 11 and has secured thereto a short piece of line 21 which passes through axial bores 22 in the vertebra $11^a$ to $11^e$, the rear end of said line 21 being made fast to the bait at the tail, preferably by passing it through the screw plug 23 in the rear end of the rearmost vertebra $11^e$ and knotting it at the end as at 24 to permit its withdrawal in a forward direction. In the grooves 18 two side cords or lines 25 are secured to the drum 15 to wind in opposite directions on the drum and pass rearwardly therefrom through holes 26 in the plug 11 and through holes $26^a$ in flanges 27 on the vertebræ $11^a$ $11^e$, the rear ends of said lines 25 being secured to the tail in any suitable manner preferably by terminating them at the flange 27 of the rearmost vertebra $11^e$ and forming knots 28 thereon.

Hooks 29 are provided at the tail of the bait preferably secured to rearwardly directed flanges 30 on the rearmost vertebra $11^e$ and within the rear end $14^a$ of the flexible covering 14. The edges of the portion $14^a$ are provided with light spring wires 31 that normally maintain the covering $14^a$ taut at the sides of the hooks 29, said springs being yieldable to an attack by a fish to permit the fish to take the hooks, 29.

At the mouth of the body 10 the same is provided with guides 32 which may be in the form of rollers between which the line element 19 passes, said element having a stop 33 thereon to bring up against the front of the guides 32 for limiting the rearward movement of the element 19 toward the drum 15.

The fins 16 are tight on the shaft $15^a$ of drum 15 to turn therewith but are held by friction which may be manually overcome to dispose the respective fins 16 at different angles, one being directed upwardlly and the other downwardly. To permit the angular adjustment of the fins 16 they are formed with slots 34 into which pins 35 on shaft $15^a$ extend.

At the top and bottom of the body 10 fins 36 of flexible material are provided, disposed at opposite sides of top and bottom hooks 37 shielded by said fins, and said fins have at their edges spring wires 38 secured at their front ends as at 38ª to the body and tending to normally maintain said fins screening the hooks 37, the springs being yieldable to an attack of the fish to permit the grasping of a hook 37.

The turning of the drum 15 is limited in both directions by a pin 39 rising from the bottom of the bait at the interior and projecting between spaced stops 40 at an end of the drum 15.

In order to maintain the bait properly disposed with the back uppermost the top of the body 10 has an air chamber 41 made airtight in any suitable manner by a covering 42.

Within the body 10 provision is made for containing cotton or like absorbent material 44, the same being here shown as held between the plug 11 and a bracket 43 within the body 10. The absorbent material 44 is soaked with fish oil as a lure. The oil may escape rearwardly through the holes 21, 26, 26ª to pass out at the tail of the bait and through oil holes 45 along the sides of the tail portion.

In use the bait 10 is attached to the fish line by an eye 19ª or the like. As the line is tautened it puts a strain on the line section 19 and spring 20 and the drum 15 is at the same time turned in one direction as far as its stop 40 will permit. The action causes the reversely wound line sections 25 to cause the tail to flip to one side and with the action of the fins 16, the bait is caused to turn to one side and rise toward the surface. The bait is operated by a series of short jerks successively tautening and slackening the line 19. The slackening of the line 19 permits the spring 20 to react and turn the drum in the opposite direction causing bait to turn to the other side and dive causing life-like movements of the bait. By setting the fins 16 at different angles to each other the bait will be caused to continuously revolve in either direction as desired and also to deviate from a direct forward movement by reason of the shell movements.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. An artificial bait having a laterally flexible tail portion, a drum in said bait, elements winding in opposite directions on said drum and connected with said tail, and an element winding on said drum and adapted to connect with a fish line.

2. An artificial bait having a laterally flexible tail portion, a drum in said bait, elements winding in opposite directions on said drum and connected with the tail, a flexible element connected with said tail near the rear end and extending forwardly, a spring secured at one end to said element, and a flexible element secured to the front end of said spring and winding on said drum, said last-mentioned element extending forwardly through the mouth of the bait and adapted to be secured to a fish line.

3. An artificial bait having a laterally flexible tail, a flexible element connected with said tail near the rear end and extending forwardly, a spring secured at one end to said element, a drum forward of said spring, and a flexible element secured to the front end of said spring and winding on said drum, said last-mentioned element extending forwardly through the mouth of the bait and adapted to be secured to a fish line.

4. An artificial bait including a body, a flexible tail on said body, a drum mounted in said body, an element winding on said drum and adapted to be connected with a fish line, means to cause said element to move said tail when said element is drawn taut, and to cause reverse movement of the tail when said element is slackened.

5. As a new article of manufacture, an artificial bait including fins adapted to be disposed at angles to cause turning movement of the bait, a flexible tail on said bait, and means adapted for connection with a fish line and adapted to vibrate the tail in response to alternate tautening and slackening of the line.

6. An artificial bait having a hook thereon and flexible material resiliently sustained in the form of screens at the sides of the hook, the screens being open at the rear ends thereof to expose the hook and yieldable forwardly to the impact of a fish to recede from the screening positions.

7. An artificial bait having a hook at the tail end, flexible material normally screening said hook, and spring means normally maintaining said material in screening relation to the hook and yieldable to pressure thereon by a fish to recede against the tension of the spring means and expose the hook for the taking of the same by the fish.

8. An artificial bait having fins of flexible material, hooks normally screened by said material, and spring means sustaining the fins in screening relation to the hooks, and yieldable to impact of a fish to permit the taking of the hooks.

9. An artificial bait having vertebræ in the tail portion thereof, the respective vertebræ having flanges, lines passing through said flanges, a drum on which said lines are oppositely wound, and a flexible element passing substantially axially through the vertebræ and secured at its rear end, said element being wrapped about said drum and extending forwardly through the mouth of the bait to permit of its connection with a fish line.

10. As an article of manufacture, an artificial bait having a transverse shaft, and fins on said shaft, and frictionally held thereon against accidental displacement, transverse pins extending through the shaft and projected therefrom, the fins having slots into which said pins project to permit the friction between the fins and shaft to be manually overcome and the fins optionally disposed at different angles.

JOHN FRAME.